E. GASE.
TRAVELING WEIGHING MACHINE.
APPLICATION FILED APR. 21, 1921.
1,414,694. Patented May 2, 1922.
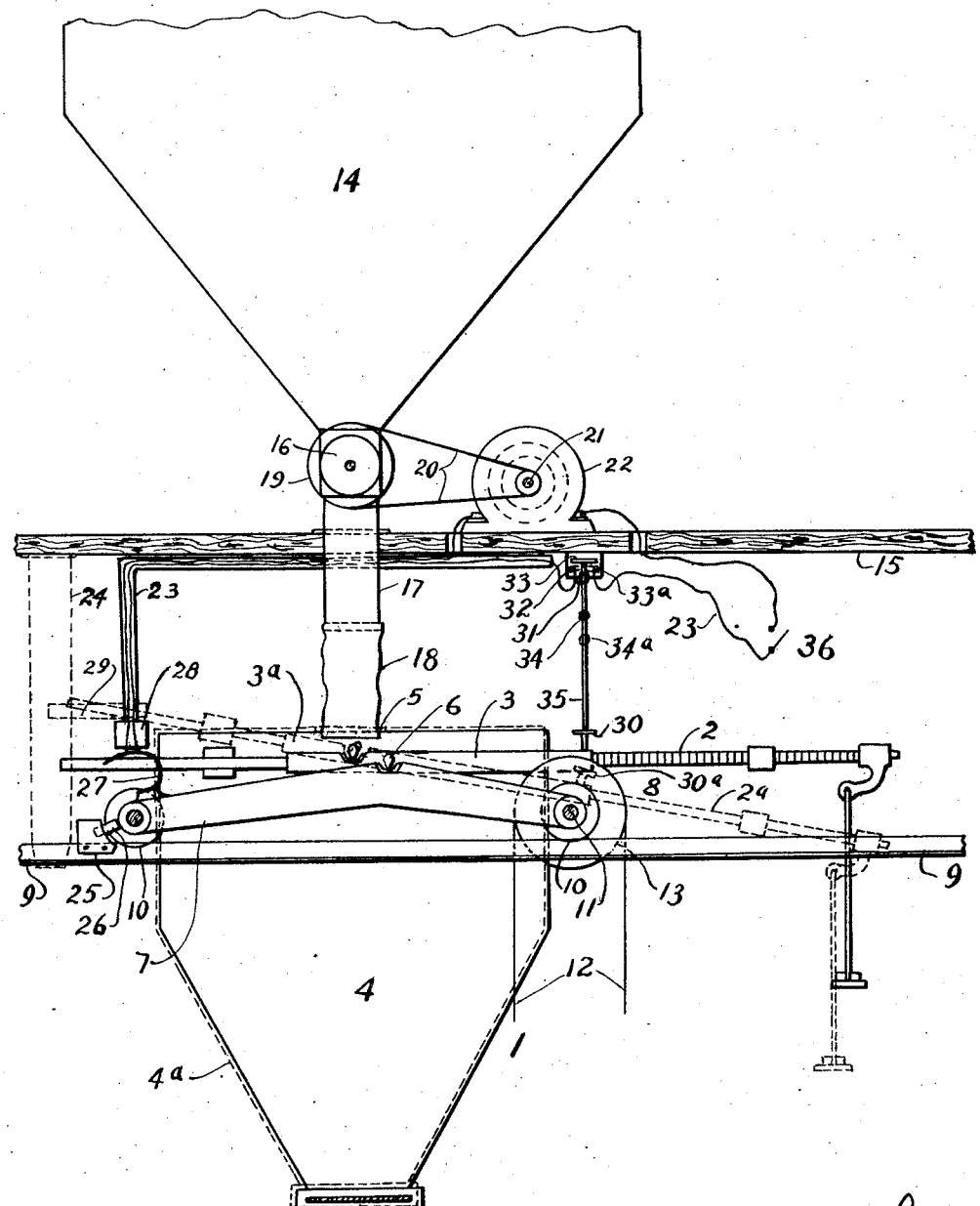
Eugene Gase
INVENTOR

UNITED STATES PATENT OFFICE.

EUGENE GASE, OF SAGINAW, MICHIGAN, ASSIGNOR TO BAKER-PERKINS MANUFACTURING CORPORATION, OF SAGINAW, MICHIGAN.

TRAVELING WEIGHING MACHINE.

1,414,694.  Specification of Letters Patent.  Patented May 2, 1922.

Application filed April 21, 1921. Serial No. 463,287.

*To all whom it may concern:*

Be it known that I, EUGENE GASE, a citizen of the United States, residing at Saginaw, in the county of Saginaw and State of Michigan, have invented new and useful Improvements in Traveling Weighing Machines, of which the following is a specification.

This invention relates to that kind of traveling weighing machines in which the balance is supported by a truck running on rails arranged above the charging openings of the machines receiving the weighed materials, and is fed from a chute above to which these materials are supplied by a conveyer driven by an electromotor. The object of my invention is to arrange the machine so that the feed conveyer and thereby the weighing operation are started automatically, as soon as the balance has been placed in the right position underneath the chute for being charged, and that the conveyer is automatically stopped and thereby the supply of material to the balance cut off, as soon as the required quantity has entered the same, whereby the whole operation is greatly facilitated and accelerated.

To this end, I fix a stop block to the rails at such a point, that, when the wheels of the truck are pushed against the same, the charging opening of the weighing hopper of the balance and the outlet of the feeding chute are in alignment ready for the charging operation, and mount on the truck itself a spring or similar device so adapted and arranged as to actuate a pushbutton starter included in the electric circuit for the motor and thus to start the conveyer simultaneously with the truck reaching its position against the stop block. For stopping the motor as soon as the balance has received the required weight, I use the ascension of the stem of the scale beam for opening a switch arranged in the circuit to the motor and thus stopping the latter by means of a contrivance which I have described in my pending application for Letters Patent: "Automatic weighing machines", Serial No. 428,257, filed Dec. 4, 1920. In order to avoid any possible mistake or mishap, I preferably place in the electric circuit a third switch which is closed by the attendant, when he wants to start weighing (which operation—or course—can only take place after the truck is in its required position agains the stop block), and which opens simultaneously with the opening of the switch acted upon by the rising stem of the scale beam, thus definitely breaking the current as soon as weighing has been finished.

The accompanying drawing serves for more fully explaining the novel features and devices and the working of my invention.

The reference numeral 1 indicates the balance consisting of a furcated scale beam comprising the graduated stem 2 and the branches 3, and of the weighing hopper 4 suspended from the latter and provided in its top with the charging opening 5. Small rods 6 ending in knife edges and serving as fulcrum of the balance are fixed to the sides of the branches 3 and supported in bearings arranged on the side beams 7 of the truck 8 running on the rails 9. The wheels 10 of the truck 8 are mounted on the axles 11 rotating in bearings placed in the ends of the side beams 7. The truck 8 is moved on the rails 9 by hand by means of the chain 12 running over the sprocket wheel 13 fixed to the axle 11. The material to be weighed is contained in the store bin 14 situated on the floor above the balance, is fed from the bin by the screw conveyer 16 into the chute 17, and passes then from the latter through the canvas tube 18, attached to the lower end of 17, and the opening 5 into the weighing hopper 4. The conveyer 16 is worked by means of the pulley 19 and the belt 20 from the driving pulley 21 of the electromotor 22 to which the electricity is led by the circuit 23. The rails 9 are carried by brackets 24 fixed to the ceiling 15; one of the rails is provided with the stop block 25 rigidly bolted to the same at such a point, that, when the wheel 10 of the truck 8 touches the block 25, the chute 17 is in the right position for charging the weighing hopper 4, the canvas tube 18 reaching a little way into the opening 5, as shown in the drawing. Springs 26 fixed to the sides of the block 25 and gripping over the rim of the wheel 10 serve as buffer and for holding the truck 8 against the block. The strong steel spring 27 is mounted on a projection of the side beam 7 at such a point and so adapted that, as soon as the truck 8 is arrested by the block 25 and thus the balance ready to be charged, it actuates the pushbutton starter 28 arranged in the circuit 23, suspended from the ceiling 15 by the tubing enclosing the electric wires and secured by the support 29 fixed to the bracket 24. The small disc-like plate 30 is mounted by means of a small rod on the top of the stem 2 of the scale beam, and vertically above its position, when the truck 8 rests against the stop block 25, the switch 31 is arranged in the circuit 23. The switch 31, contained in the housing 32, is kept closed by the small plate 33 resting thereon. The latter carries at its underside the short rod 34 slidably mounted in a stuffing box provided in the bottom of the housing 32 and hinged to the triprod 35. Both rods combined are of such a length and so arranged that, as soon as the weighing hopper 4 has received the required amount of material and consequently the stem 2 rises, the disc 33 raises the rods 35 and 34 and, thereby lifting the plate 33, opens the switch 31 and stops the motor and conveyer. The switch 36 arranged in the circuit 23 controls the pushbutton starter 28 and is opened simultaneously with the opening of the switch 31 when the weighing operation has been finished.

In the drawing the balance is shown in its working position, the wheel 10 being held against the block 25 by the springs 26, and the spring 27 being in the position of acting upon the pushbutton starter 28. The stem 2 and the branches 3 of the furcated scale beam, the weighing hopper 4, the disc 30, the plate 33, the short rod 34 and triprod 35, as represented in uninterrupted lines, are in the position, when the weighing hopper has been duly charged and the balance is in equilibrium, the current having been broken by the raising of the plate 33 from the switch 31, and the switch 36 having been simultaneously opened; the same parts, drawn in dotted lines and indicated by the same numerals with the addition of the letter "a", are shown in the position, when the weighing hopper is still empty, the switch 31 therefore closed, and the switch 36 ready to be closed by the attendant to start weighing.

I claim:

1. In a machine of the kind described, the combination with a balance of a wheeled truck supporting the said balance, of rails on which the said truck is moved, of a conveyer supplying the materials to be weighed by means of the said balance, of an electromotor driving the said conveyer, of a chute directly transferring the materials to be weighed coming from the said conveyer into the weighing hopper of the said balance, of a stop block fixed to the said rails at such a point, that, when the said truck is placed against the same, the weighing hopper of the said balance is situated underneath the said chute in the right position for being charged, of a starter for the said motor, arranged at a stationary support near the said stop block, and of a device mounted on the said truck at such a point and so adapted as to actuate the said starter, as soon as the said truck touches the said stop block.

2. In a machine of the kind described, the combination with a balance, of a wheeled truck supporting the said balance, of a side beam connecting the wheel axles of the said truck, of rails on which the said truck is moved, of a chute for charging the said balance with the materials to be weighed, of a conveyer supplying the same to the said chute, of an electromotor driving the said conveyer, of a stop block fixed to the said rails at such a point, that, when the said truck is placed against the same, the said chute is in the right position for charging the said balance, of springs fixed to the sides of the said block and gripping over the rim of the wheels of the said truck, of a spring mounted on a side beam of the said truck, and of a pushbutton starter placed within the electric circuit, the said spring and the said starter being so adapted and so situated to each other and to the said stop block that, as soon as the said truck touches the latter, the said spring actuates the said starter and thus starts the said motor and conveyer.

3. In a machine of the kind described, the combination with a balance comprising a furcated scale beam, the graduated stem of which is adapted to receive the weights, and a weighing hopper suspended from its branches, of a truck supporting the said balance, of rails on which the said truck is moved, of a chute for charging the said balance with the material to be weighed, of a conveyer supplying the same to the said chute, of an electromotor for driving the said conveyer, of a stop block fixed to the said rails at such point that, when the said truck is placed against the same, the said balance is situated underneath the said chute in the right position for being charged, of an automatic device for starting the said motor as soon as the said truck touches the said stop block, of a disc mounted on the stem of the said scale beam, of a switch arranged in the electric circuit to the said motor vertically above the position of the said disc when the said truck touches the said stop block, of a plate keeping the said switch closed by resting thereon, and of a hinged triprod suspended from the underside of the said plate and having such a length and being so arranged that, when the stem of the said scale beam rises in consequence of the said weighing hopper having received the required weight of material, the said disc raises the said triprod and plate, and, thereby opening the said switch, stops the said motor.

4. In a machine of the kind described, the combination with a balance comprising a furcated scale beam, the graduated stem of which is adapted to receive the weights, and a weighing hopper suspended from its branches, of a truck supporting the said balance, of rails on which the said truck is moved, of a chute for charging the said balance with the material to be weighed, of a conveyer supplying the same to the said chute, of an electromotor for driving the said conveyer, of a stop block fixed to the said rails at such a point, that, when the said truck is placed against the same, the said balance is in the right position underneath the said chute for being charged, of a pushbutton starter for the said motor, of a spring adapted to actuate the said starter and mounted on the said truck, the said spring and starter being so situated to each other and to the said stop block that, as soon as the said truck touches the latter, the said spring actuates the said starter and thus starts the said motor, of a disc mounted on the stem of said scale beam, of a switch arranged in the electric circuit to the said motor vertically above the position of the said disc, when the said truck touches the said stop block, of a plate keeping the said switch closed by resting thereon, and of a hinged triprod suspended from the underside of the said plate and having such a length and being so arranged, that, when the stem of the said scale beam rises in consequence of the said weighing hopper having received the required weight of material, the said disc raises the said triprod and plate, and, thereby opening the said switch, stops the said motor.

EUGENE GASE.